United States Patent Office

3,687,690
Patented Aug. 29, 1972

3,687,690
CONFECTION AND METHOD OF MAKING IT
Carl O. Moore, Rochester, Ill., assignor to A. E. Staley
Manufacturing Company, Decatur, Ill.
No Drawing. Filed Mar. 31, 1970, Ser. No. 24,366
Int. Cl. A23g 3/00
U.S. Cl. 99—134 G
12 Claims

ABSTRACT OF THE DISCLOSURE

Pressure-cooked confectionery compositions for enrobed, glazed or otherwise coated pieces of candy and for other confectionery uses characterized in having acid-thinned high amylose starch which provides the structure for the candy in place of the structure provided by crystallized sugar. Specific examples of the composition are fondant-like cream centers in which the sweetener has a substantially higher content of corn syrup solids and/or invert sugar syrup and substantially lower content of sucrose, either in crystalline or dissolved form, than conventional fondant centers and yet has the cream center structure, body and texture. The composition is thin at high temperature but thick and creamy at low temperature, permitting great simplification in the candy-making process.

DISCLOSURE OF THE INVENTION

This invention relates, generally, to confectionery compositions of a creamy character useful as filling or coating in enrobed, glazed or otherwise coated candy pieces, and as fillings and icings in pastries and the like, and to methods of making such compositions.

More specifically, the invention relates to candy, pastry-center and icing compositions of the class described, characterized, by way of comparison with conventional or traditional fondant cream centers, in having substantially higher content of corn syrup solids and/or invert sugar, and a substantially lower content of sugar, i.e., sucrose or saccharose, either in crystalline or dissolved form. These marked departures from the conventional or traditional are permitted because the composition contains relatively small percentages of acid-thinned high amylose starch and, optionally, opaquing agents. Furthermore, in contrast to candy of the starch-jelly or gum type, the texture of the present candy, after aging, has a stringy, long, relatively salve-like, inelastic character rather than a short, relatively rigid, resilient character of gum confections.

In general, the cream confection compositions of the present invention can be of as good or better quality than the conventional fondant cast cream compositions of the prior art. They are much more easily prepared, and are substantially less costly both in the basic ingredients and in the cost of manufacturing. Although intended principally as cream fillings, as in chocolate-enrobed cream-center candies, the composition and method of the present invention can also be used to make fillings for cookies, icings for pastry, caramel coatings for conventional nougat centers, cast caramel and similar products.

Conventionally, cast cream fondant centers for enrobed, glazed or otherwise coated candy are prepared by first making a so-called "fondant cream." This entails cooking a mixture of sugar and corn syrup (e.g., 80 parts by weight of sugar (sucrose) to 20 parts by weight of corn syrup) to a very precise boiling temperature (e.g., 244° F.) followed by cooling the liquid to a very precise temperature (e.g., 115° F.). The resulting thick cooled syrup is then mechanically worked until sugar crystals (mainly microscopic) are developed. A so-called "bob" syrup is separately prepared and heated. The fondant cream is then blended with the warm "bob" along with frappe, color, invertase, flavoring, etc., as desired. The resulting candy composition is then cast or deposited, after temperature adjustment to between 140°–160° F., in dry-starch molds. On being held overnight, or longer as required, the candy centers harden and dry sufficiently to be handled. Thereupon, the candy centers are removed from the molds and shaken and brushed clean and free of the starch, leaving the cream centers ready to be enrobed, glazed or otherwise coated with chocolate or other coatings as desired.

The body structure of fondant cream centers prepared from conventional compositions, and in accordance with traditional techniques, is dependent on very small or microscopic sugar (sucrose) crystals that form during mechanical working of the cooled syrup and subsequent storage. The cooking to achieve a precise water content (through selection of boiling point and the cooling to achieve the precise crystal structure are critical operations. Furthermore, because of this dependence on sugar crystals for structure, it has not been practical to reduce the sugar content and increase the proportion of corn syrup and/or invert sugar syrup in the formulation despite the convenience and value of using these products.

It has now been found that, in accordance with the present invention, by utilizing certain acid-thinned high amylose starches, it is entirely practical to lower substantially, or even to eliminate, the sucrose content and substantially increase the starch syrup and/or invert sugar content without sacrificing quality of the finished product. The result is an appreciable reduction in ingredient cost and great simplification in manufacturing. It is no longer necessary to rely on the slow and painstaking crystallization of sugar, with all its careful control and attention to detail to obtain the desired granulation for the texture and structure of cream confections. Not only does this lack of dependence on sugar reduce cost, but it also permits much greater flexibility in choice of sweetener and other ingredients since the special starch is used at a very low percentage of the weight of the product. Because the starch has so little taste of its own, this permits maximum flexibility in choice of sweetener, flavor and other adjuvants and ingredients.

Accordingly, an object of the invention, generally stated, is to provide compositions which may be used as such, or mixed with the usual adjuvants, in making cream centers of enrobed, glazed or otherwise coated candy pieces, and in other bakery or confectionery cream-type compositions, and the like, wherein the necessary body structure is provided by a minor proportion of acid-thinned high amylose starch instead of by the crystallization of sugar.

Another important object of the invention is to provide a new and improved method of making cream centers for enrobed, glazed or otherwise coated candy pieces or other bakery and confectionery products having a creamy-textured composition supported by chocolate, by crackers, by solid nougat, etc.

It is a further object of this invention to provide a composition which is acceptable as a high quality cream center and yet which is produced by a simple, economical process which is readily adaptable either to continuous or batch operation.

Another object of the invention is to provide an improved method of making candy compositions of the class described wherein the basic ingredients are merely slurried and cooked at an elevated temperature in a very short time in a pressure cooker, cooled and are then capable of being cast immediately in starch molds, or extruded, or otherwise formed.

It is also an object of this invention to provide a composition which lends itself to much creative modification, e.g., by addition of adjuvants such as frappe, color, flavor, fat or other optional ingredients thereto, and yet which can be formed or shaped, whether by conventional starch molding or otherwise, over a wide temperature range, e.g., 120° F. to 220° F., and which can be used in other ways.

Certain other objects of the invention will in part be obvious and will in part appear hereinafter.

The compositions of the present invention, and the methods of preparing the same according to the present invention, offer the following advantages over conventional fondant compositions and methods of preparing the same: lower costs; separate fondant cream and bob preparations are not required, although the cooked composition of this invention can be blended with other process streams if desired, as illustrated hereinafter; invertase technology is not required to soften the centers and make them more fluid because texture can be controlled with the starch; the range of casting temperatures for cream texture is broad, e.g., between 120°–220° F. in contrast to a limited range of 140°–160° F. generally practical in traditional cream fondant technology; casting consistency (viscosity or fluidity) can be thinner, as desired, permitting speedier operation and more precise and detailed molds; less equipment is required; labor requirements are reduced; processing tolerances are broad in contrast to the critical processing temperatures of known fondant cream preparation; shelf-life is equal to or better than the usual fondant; and production capacity is equal or, in most instances much greater, with less capital outlay.

For a more complete understanding of the nature and scope of the invention, the following detailed description is presented including illustrative working examples. Unless otherwise indicated, quantities are expressed in part by weight, and percentages (or percent), are percentage by weight. The abbreviation d.s.b. means "dry substance basis," and all percentages except solids content and water content are expressed on that basis. Water and total solids content are expressed on the basis of the weight of the complete composition.

The confection of the present invention comprises a shaped, solidified composition which is tractile and inelastic and has, as its essential ingredients, sweetener, water and acid-thinned high amylose starch. The high amylose starch is acid-thinned to a fluidity in the range of 20 to 90 cc. This starch component (high amylose starch) is 3 to 10%, dry substance basis, of the composition. The starch in this composition is used principally to provide the basic structure, shape and texture of the candy in which it is used. However, as described hereafter, the texture may be modified in many ways. For simple, fondant-like cream centers cast in molds, the starch is preferably 4 to 8% of the solids in which the total of starch and sweetener is at least 85%; more than 8% yields a product that is too chewy and tough for a cream center and less than 4% gives difficulty in handling the cast centers.

The sweetener solids in the composition are at least 50% by weight and any balance of the composition is non-carbohydrate, finely divided, intimately dispersed conventional candy ingredients. The sweetener can be sucrose, dextrose, corn syrup solids, invert sugar, levulose, lactose, as well as other monosaccharides and disaccharides, and combinations of these. Other known sweeteners, such as honey, maltose and the like, may also be used alone for the sweetener solids or mixed with other sweeteners. The preferred sweeteners, for their contributions to manufacturing ease, are syrups selected from the group consisting of corn syrup and invert syrup. The proportion of sugar (sucrose) used can be kept to a minimum and used solely for flavor; it preferably does not exceed 45% of the sweetener solids. If more than about 45% sucrose (less than 55% syrup) is used, the composition is likely to develop undesirable coarse sugar crystals during shelf storage.

As noted, to the basic composition, known typical adjuvants and conventional candy ingredients can be added. For example, color, frappe, flavor, emulsified fat, milk solids, opaquing agents, and the like, may be added to advantage. Conventional fondant may also be used as a flavoring or to impart a specific texture, if desired. These ingredients are the balance of the compostition and may vary in amount over very broad limits, as illustrated hereafter. In cream centers, these ingredients will be less than 15% of the solids. These ingredients, which are intimately dispersed as fine particles, are referred to as "finely divided non-carbohydrate candy ingredients" to distinguish them from fruit, nuts, raisins, nougat, chocolate coating and the like, which may be used with the composition of this invention or added to it, and from the major part of the solids of the composition that is carbohydrate—starch and sweetener (in cream centers, 85% or more carbohydrate).

The composition of the invention has sufficient water to paste, i.e., gelatinize, all the starch thoroughly and to produce a pourable or pumpable composition. For this purpose, it has been found, the water-to-starch ratio in the finished composition should be at least 1.9 to 1; this is sufficient to gelatinize the starch and leave enough water for the candy texture (ratio equivalent to 16% water/ 84% solids containing 10% high amylose starch dry substance). Water from all sources is taken into account, including the water normally present in syrup and starch. The maximum water content found to be usable yields a water-to-starch ratio of 9.4 to 1 (ratio equivalent to 22% water/78% solids containing 3% high amylose starch dry substance). In the preferred composition for fondant-like creams, containing 4 to 8% starch dry substance, the water-to-starch ratio is in the range of 2.4 to 7.1. The water content actually used will depend on many factors, such as the cooking equipment used, the handling characteristics of the cooked composition (pouring, molding, etc.), the desired rate of setting, time and manner of storage of cast pieces before use, other candy ingredients added and like factors which are normally taken into account by those skilled in the art of candy manufacture. Water may also be required to hydrate some of the ingredients added.

To impart the appearance of conventional fondant-type candies derived from boiled sugar syrup, it is necessary to include an opacifying agent as an essential ingredient. This can be a food-acceptable pigment such as titanium dioxide or calcium carbonate, or a crystalline substance such as dextrose, or a frappe, or an emulsified fat (oil-in-water emulsion). Without the opacifying agent, the compositions tend to be clear and resemble jellies but without jelly texture and structure. Crystalline substances such as dextrose and powdered sugar may also be used to impart a grainy texture (mouth feel) since the compositions of the present invention are otherwise grain-free.

"High amylose starch" as used herein and in the appended claims means starch having an amylose content of at least about 50% by weight, amylose being the naturally occurring straight-chain polymer fraction of starch. The high amylose starch useful in this invention includes high amylose starch from genetic varieties of corn, amylose obtained by fractionation processes, or various amylose blends. Commercially available high amylose starches that may be used include "Mira-Quik C" (A. E. Staley Manufacturing Co.), "Amylon" 55 and 70 (National Starch and Chemical Corp.), and "Amylo-Maize" (American Maize Company). Except for Amylon 70 which has about 70% amylose, these products have around 55%. To obtain the creamy, fondant-like texture, the high amylose starch must be thinned with acid sufficiently to eliminate the rigid, resilient gel properties which are characteristic of amylose gels, but they must not be acid-thinned to the extent that the compositions of the invention do not have sufficient body structure to retain shape at room temperature and during any subsequent handling. The term "acid-thinned" refers to starches which are acid-thinned to fluidities within the range of 20 to 90 cc. For best texture, the center of this range is preferred, namely 40 to 80 cc. "Thinning" starch with acid refers to the conventional methods of altering paste viscosity of the starch by treating starch in slurry with agents that reduce its molecular weight, such as hydrochloric or sulfuric acid, organic acids or the like. The "fluidity" referred to in this description and the appended claims is measured in the classical way (Kerr, Chemistry and Industry of Starch, Academic Press (1950), page 133), using a ten-gram sample pasted in 2% sodium hydroxide at 125° F.

Although a variety of commercial starch syrups can be used in the formulations of this invention, it is preferred to use starch syrup having low higher-saccharide content since it yields a more tender product (i.e., less cohesive). For example, starch syrup produced by the so-called multiple-conversion processes, wherein initial acid conversion is followed by one or more enzyme (amylase) conversions, can be used to advantage. Such syrups normally have a dextrose equivalent in the range of 50 to 75% and the preferred starch syrups are at 60–72% dextrose equivalent. The dextrose content of the syrups is below about 43% to keep the syrups from crystallizing during shipment and storage, and the syrups are characterized by having less than 40% tetrasaccharides and higher carbohydrate polymers, i.e., at least 60% of the syrups consists of saccharides of fewer than four monosaccharide units.

The character of the candy compositions of this invention differs markedly from that of a starch jelly of the type described in Pats. 3,218,177 and 3,446,628. The difference is analogous to the difference between pastes of unmodified cereal starch and of unmodified tapioca starch. The former is regarded as "short" and the latter as "long" with reference to the gluey, stringy nature of tapioca, i.e., its tendency to pull out into long strings. See, for example, McMasters et al., Industrial and Engineering Chemistry, 36, 958–963 (1944) and Caldwell "Industrial Starch Research," Chemical and Engineering News, 30, 514–517 (1952). The "long" or "stringy" property of the candy composition of this invention resembles the texture of high quality caramel when it is pulled apart. The composition forms long strings, in contrast to a starch jelly which is designed to break cleanly with a more definite fracture. In fact, as illustrated hereafter, the composition of the invention may be made as a caramel.

On the other hand, the composition of this invention does not have the tacky character and toughness or cohesiveness characteristic of concentrated root-starch pastes. The present composition retains the good structure of cereal starch pastes but is soft and inelastic (non-resilient).

A test has been devised to demonstrate the difference between the compositions of this invention and compositions for starch jellies. This test employs an instrument known as the Bloom gelometer and yields a measure of gel strength. This is related to the "rubberiness" or "chewiness" of the composition, and distinguishes well between confections of the resilient, starch-jelly (gum) type and the soft, inelastic confection of this invention. A composition is prepared consisting of the following:

| | Grams | Percent d.s.b. |
|---|---|---|
| Sugar (sucrose) | 2,000 | 20 |
| Starch | 665 | 6 |
| 44° Be. corn syrup (64 D.E. acid-enzyme conversion) | 8,850 | 74 |
| Water | 685 | |

The total water content is 18%. This blend is pre-heated to 200° F. and then cooked in a steam-injection heater at 340° F. The cooked composition is permitted to set in a gel jar for 22 hours. The composition is then placed under the cylindrical plunger (13/16" dia.) of the Bloom gelometer and shot is added to weight the plunger. The gel strength, in grams, is taken as the number of grams of shot required to depress the plunger 4 millimeters into the test piece.

The Bloom gelometer test just described was conducted with high-amylose starch (55% amylose) in unmodified form and acid-modified to fluidity values of about 20 cc. to about 90 cc., as described before. The unmodified starch can be used, in formulas like the one shown, to make a starch jelly of the type described in the patents referred to before. The following results were obtained:

TABLE 1

| | Gel strength (grams) | |
|---|---|---|
| High amylose starch | Sample 1 | Sample 2 |
| Unmodified | Off-scale (over 500) | |
| 19 fluidity | 470 | 490 |
| 70 fluidity | 320 | 320 |
| 90 fluidity | 265 | 250 |

Accordingly, in the compositions of the present invention, the acid-modified high amylose starch yields, in the test described, a Bloom gelometer gel strength in the range of approximately 250 to 490 grams.

The results described above are surprising. It is well known in the candy industry that candy jellies (gum confections) are normally made with thin-boiling cereal starch of normal amylose content (around 25%) and generally derived from corn or wheat. This starch is produced by acid thinning to reduce the paste viscosity. The purpose is to permit use of higher starch solids in the gum confections and thereby impart the necessary gum-like relatively rigid resilient structure. Stated in another way, when starch of ordinary amylose content is used for a gum confection, the starch is modified with acid to produce a higher gel strength (more rigid) than is obtainable with unmodified starch at the same viscosity. R. W. Kerr, in Chemistry and Industry of Starch (2nd edition, 1950) comments at page 560 that the gel strength of the thin-boiling (i.e., acid-modified) starch is considerably greater than the gel strength of the unmodified starch. In the present invention, just the reverse seems to be true. It is for just this reason that acid-modified cereal starch of ordinary amylose content normally cannot be used in the present invention except as a diluent. However, in that case, the proportion of such starch of ordinary amylose content must be less than about 50% of the starch present and is preferably acid-modified to the point where it has essentially no set-back (tendency to gel).

All of the compositions of this invention are prepared by essentially the same procedure: the high amylose starch is slurried with sweetener (sugar, corn syrup, invert syrup) and a small amount of water to satisfy water requirements of the formula. The slurry may also contain heat stable ingredients such as the inorganic opacifying agent. The slurry is then cooked at a temperature in the range of 300 to 375° F. for a brief period up to about 10 minutes. Cooking is performed in a continuous pressure cooker, for example, of the steam-injection heater type. The time at temperature should be kept to a minimum and one minute at 325 to 350° F. is usually sufficient. The compositions are discharged to atmospheric pressure from the cooker, the temperature falling below 250° F. (usually about 200–220° F.). The composition is then cooled if necessary below 220° F. and the other ingredients are blended in, as desired. The composition is then ready for shaping by deposition at 120° to 220° F. in starch molds, in slab molds, on nougat center, on crackers, on nuts or fruits, etc. Within the range stated, the temperature should be chosen to avoid damaging the other materials in contact with hot mix. The candy is then cooled to room temperature and is ready for further processing.

GENERAL PROCEDURE FOR CREAMS

The basic compositions of the present invention may be advantageously prepared as cream centers for enrobed candy in accordance with the following exemplary general procedure:

(1) Prepare a slurry containing acid-thinned high amylose starch (4 to 8% d.s.b.; 40 to 80 cc. fluidity), the sweetener, e.g., sugar, corn syrup and/or invert sugar syrup, and water; preheat to 180°–200° F. This may also include opacifying agent, such as TiO₂, and other heat-stable ingredients.

(2) Pressure cook at 325° to 350° F., e.g., in a steam jet starch cooker (steam injection heater) for a period of time, usually less than a minute, sufficient to gelatinize the starch, i.e., to disperse the starch molecules. Heaters of the type used for starch jelly gum confections can be used. The cooking temperature should not exceed 375° F. and the time and temperature are chosen to assure complete gelatinization and avoid degradation of the starch and syrup components.

(3) Discharge the cooked starch/syrup blend to atmospheric pressure and cool below 220° F.

(4) Blend in adjuvants (i.e., frappe, color, flavor, fat, etc.).

(5) Deposit liquid into dry starch mold (about 7–8% moisture) in temperature range of 120°–220° F.

(6) Preferably, sift a thin layer of dry molding starch over the exposed surfaces of the freshly cast candy. This can be omitted for many varieties, but is desirable in drying the cast centers for ease in handling.

(7) If desired, store molds and candy in curing rooms at 75°–100° F. and 40–50% relative humidity to maintain their condition.

(8) Allow centers to cool to room temperature. (In a continuous system, the molds and candy are conveyed through a cool dehumidified tunnel.)

(9) Shake to remove pieces from molds with mild, or no, brushing treatment so as to leave some starch on the surface of each piece.

The centers are then ready for the enrobing and should pass through an air (brushless) cleaner just before enrobing.

The following specific examples will serve to illustrate and further make known the invention. In these examples, the starch is high-amylose starch of 55% amylose from genetic varieties of corn.

EXAMPLE 1

This example illustrates a typical cream center that is fondant-like, but without the usual grain of fondant. The following ingredients are used:

| Parts by weight | Ingredient | Percent d.s.b. |
|---|---|---|
| 6.6 | Acid-thinned high amylose starch (70 cc. fluidity) | 6 |
| 20 | Dry sugar (sucrose) | 20 |
| 88 | 64 D.E. dual conversion corn syrup, 44° Be | 73.5 |
| 0.5 | Titanium dioxide | 0.5 |
| 10 | Water | |
| | Flavor and color added, as desired | |

A slurry, formed of all the above ingredients except flavor and color, was preheated to 200° F. The slurry was then pressure cooked at 335° F. The pressure cooking was virtually instantaneous in a steam jet mixer, like the type disclosed in U.S. Pats. 2,871,146 and 2,919,214, and the cooked composition was retained at the high pressure, high temperature for less than one minute. The cooked material was discharged into a flavoring kettle at atmospheric pressure. Color and flavor were added, and the batch was cast in a starch mold, at composition temperature of 160° F. (Temperature is not critical.) Ordinary starch was sifted over the molded pieces to form a thin layer of dry starch on the exposed surfaces. The mold was held overnight at 90° F. and 50% relative humidity, then allowed to cool to room temperature. The pieces were shaken out of the mold leaving a light deposit of starch on the srufaces. The de-molded centers were enrobed in chocolate coating to provide cream center chocolate drops.

EXAMPLE 2

This was similar to Example 1 but the cream center was lightly grained. The following composition was used:

| Parts by weight | Ingredient | Percent d.s.b. |
|---|---|---|
| 6.7 | Acid-thinned high amylose starch (60–70 cc. fluidity). | 4.2 |
| 137.2 | 64 D.E. dual conversion corn syrup, 44° Be | 80 |
| 9.15 | Water | |
| 0.25 | Titanium dioxide | 0.18 |
| 21.5 | Powdered sugar (sucrose) | 15.0 |
| 0.95 | Whipping protein (enzyme-treated soybean protein). | 0.62 |
| | Flavor and color as desired | |

In accordance with the procedure of Example 1, 6.7 parts of acid-thinned high amylose starch, 62.5 parts corn syrup, 4.3 parts water and 0.25 part titanium dioxide were mixed to form a slurry and the slurry was preheated and cooked. The cooked composition was discharged into a mixing kettle where 50.0 parts of corn syrup (at room temperature) were added, reducing the temperature immediately from about 200° F. to about 160° F.

A separate frappe was prepared by whipping 24.7 parts of the corn syrup, 5.85 parts of water with the powdered sugar and whipping protein. The color and flavor can be added to the frappe.

The cooled composition and the frappe were mixed well, and the composition was poured into a starch mold. The candy was completed as described in Example 1. It is desirable to avoid addition of the frappe to the pressure-cooked material before it is cooled because the delicate whipped structure of the frappe is coarsened as the air bubbles expand and break at the elevated temperature. Large air bubbles makes the texture effect less desirable.

EXAMPLE 3

This example is similar to Example 2 but it yielded a marshmallow cream center. The marshmallow texture is produced by omitting the powdered sugar from the frappe. This eliminates the grainy feel of the cream and produces a smooth aerated product resembling marshmallow cream rather than grained cream. The following ingredients were used:

| Parts by weight | Ingredient | Percent d.s.b. |
|---|---|---|
| 6.7 | Acid-thinned high amylose starch (60–70 cc. fluidity). | 4.8 |
| 117.1 | 64 D.E. dual conversion corn syrup 44° Be | 78.5 |
| 20 | Sugar (sucrose) | 16.1 |
| 0.3 | Titanium dioxide | 0.24 |
| 7 | Water | |
| 0.5 | Whipping protein (as in Example 2) | 0.36 |
| | Flavor and color as desired | |

The high amylose starch, sugar, titanium dioxide and water were heated with 44.3 parts of the syrup and cooked as described in Example 1. The cooked composition was cooled by adding 44.3 parts by weight of the corn syrup. A separate frappe was prepared by whipping together the whipping protein and the balance of the corn syrup. The frappe was blended with the cooled cooked composition, and the procedure of Example 1 was followed to produce marshmallow cream centers.

EXAMPLE 4

This example illustrates the preparation of a cast caramel center. The composition may also be used to prepare a caramel-flavored coating. The following ingredients were used:

| Parts by weight | Ingredient | Percent d.s.b. |
|---|---|---|
| 8.8 | Acid-thinned high amylose starch (60-70 cc. fluidity). | 8 |
| 25 | Sugar (sucrose) | 25 |
| 5.15 | Non-fat milk solids | 5 |
| 2 | Coconut fat (melting point 119° F.) | 2 |
| 71.25 | 64 D.E. dual conversion corn syrup 44° Be. | 59.5 |
| 0.5 | Titanium dioxide | 0.5 |
| 10 | Water | |
| | Caramel flavor, color, as desired | |

The procedure followed was identical with that of Example 1. The fluid composition was cast as a cream center, but is can also be used to coat a bar center consisting of nougat, fudge or the like. It is possible, before the composition hardens, to sprinkle such a coated nougat or fudge with nuts to make a nut roll.

EXAMPLE 5

The procedure of Example 1 is followed to produce a non-grained cream except that the sugar and corn syrup were replaced with 39.5 parts by weight of sugar and 72.0 parts by weight of invert sugar syrup. The composition contained 54.0% d.s.b. invert sugar.

EXAMPLE 6

A different enrobing material adapted for coating a nougat or fudge center was made from the following ingredients:

| Parts by weight | Ingredient | Percent d.s.b. |
|---|---|---|
| 5.36 | Acid-thinned high amylose starch (70-80 cc. fluidity). | 5 |
| 5.15 | Non-fat milk solids | 5 |
| 20 | Sugar (sucrose) | 20 |
| 0.5 | Sodium bicarbonate | 0.5 |
| 82.5 | 64 D.E. dual conversion corn syrup 44° Be. | 69 |
| 0.1 | Titanium dioxide | 0.1 |
| 0.4 | Salt (sodium chloride) | 0.4 |
| 6.04 | Water | |
| | Flavor and color as desired | |

All of the ingredients except the color and flavor were blended, preheated to 200° F. and the blend was pressure cooked at 340° F. as in Example 1. After discharge from the pressure cooker, the color and flavor were added. The product can be poured at a temperature of 160–200° F. over nougat or fudge in enrobing equipment. Immediately after pouring, nuts can be deposited in the coating, if desired.

EXAMPLE 7

This illustrates an extruded filling that can be used to make a nut cluster. The ingredients used were as follows:

| Parts by weight | Ingredient | Percent d.s.b. |
|---|---|---|
| 6.7 | Acid-thinned high amylose starch (70-80 cc. fluidity). | 6 |
| 22 | Sugar (sucrose) | 21 |
| 2.2 | Unmodified high amylose starch | 2 |
| 77.5 | 64 D.E. dual conversion corn syrup, 44° Be. | 65 |
| 4 | Vegetable fat (92° F. melting point) | 4 |
| 0.05 | Monoglyceride emulsifier (80% with 20% hydrogenated fat). | 0.05 |
| 1 | Sodium caseinate | 1 |
| 0.6 | Salt | 0.6 |
| 0.35 | Titanium dioxide | 0.35 |
| 4.6 | Water | |
| | Color and flavor if desired | |

All of the ingredients except color and flavor were prepared and cooked as in the last example and then the color and flavor were added. This product, which is relatively viscous, is extruded at temperature in the range of 125–175° F. By depositing the extruded composition onto nuts, permitting the composition to solidify and then enrobing with chocolate, a nut cluster is prepared.

EXAMPLE 8

This illustrates a formulation that can be cast in slab form at about 200° F. The following are the ingredients used:

| Parts by weight | Ingredient | Percent d.s.b. |
|---|---|---|
| 10 | Acid-thinned high amylose starch (70-80 cc. fluidity). | 9 |
| 21 | Sugar (sucrose) | 21 |
| 76.25 | 64 D.E. dual conversion corn syrup, 44° Be. | 65 |
| 1.02 | Whole milk solids | 1 |
| 2.75 | Vegetable fat (92° melting point) | 2.75 |
| 0.05 | Monoglyceride emulsifier (Example 7) | 0.05 |
| 0.1 | Titanium dioxide | 0.1 |
| 1.0 | Salt (sodium chloride) | 1.0 |
| 0.12 | Disodium phosphate | 0.1 |
| 6.68 | Water | |

The procedure used is the same as that in previous examples. The cast slabs of caramel can be cut and enrobed with chocolate or other coating using the methods for conventional caramel.

The foregoing examples illustrate well the wide versatility of the present invention. In addition to versatility, the method is extremely simple to use requiring a minimum of equipment. Especially important is the fact that the method can be used without close control over the various steps in the process, that is necessary with conventional fondants. The unique characteristic of the method is that the composition of the invention has a very low viscosity at the temperature at which it can be cast and yet it sets to a texture that is creamy at room temperature but with sufficient rigidity to be handled in enrobing equipment. On the other hand, the composition itself can be used as a coating, as illustrated, by pouring at the elevated temperature and allowing it to set under the proper conditions. The cream center composition can also be extruded into wafers or cookies where it serves as cream filling.

As illustrated in Example 7, a small amount (up to 25% of the total high amylose starch) of unmodified high amylose starch can be used with the present invention. This imparts additional rigidity and rapid gel, beneficial to confections that are not deposited in molds, but are cast in slab form and then cut, for example caramel-style candies. Accordingly, it is desirable in cream centers, according to this invention, to limit this percentage to do more than 10% of the high amylose starch as unmodified and, for the best texture, preferably to use none at all.

Since many embodiments may be made of this invention, and since many changes may be made in the embodiments described, the foregoing is to be interpreted as illustrative only and the invention is defined by the claims following hereinafter.

What is claimed is:

1. A solidified confectionery composition of a fondant cream to caramel texture, said composition comprising from 3 to 10% pasted starch for its body structure, at least 50% sweetener solids and water in a proportion that the water-to-starch ratio is at least 1.9, the balance of the solids being finely divided, intimately dispersed candy ingredients, said starch consisting of high amylose starch of which at least 75% has been acid-thinned to an alkaline fluidity of 20 to 90 cc., said composition containing at least enough water to paste the starch completely with said composition being further characterized as having tractile, long, inelastic, cream-like texture in contradistinction to the short, relatively rigid, resilient textural properties of a starch jelly confectionery.

2. The composition of claim 1 in which all of said starch is acid-thinned high amylose starch.

3. The composition of claim 2 in which the composition has a consistency and hardness like a cream fondant, in which the starch content is 4 to 8% and in which the ratio of water to starch is in the range of 2.4 to 7.1.

4. The composition of claim 3 in which the sweetener is more than 85% of the composition and comprises at least 55% of a normally liquid syrup selected from the group consisting of invert syrup and starch syrup.

5. The composition of claim 4 in which the syrup is starch syrup.

6. The composition of claim 5 in which the composition includes an edible opacifying agent.

7. The composition of claim 3 in which the starch is an acid-thinned high amylose starch thinned to an extent that a composition containing 6% of such starch, 20% sugar and 74% solids from starch syrup, when cooked with 18% water, sets to yield a Bloom gelometer gel strength in the range of 250 to 490 grams.

8. The method of making a confectionery composition of fondant cream to caramel texture and suitable for use as a cream center, filling, coating or the like, said method comprising heating a liquid composition comprising (a) from 3 to 10% starch, (b) at least 50% sweetener solids and (c) water to a temperature of at least 300° F. to paste the starch thoroughly, any balance of the solids in said composition being finely divided candy ingredients, said starch being high amylose starch at least 75% of which is acid-thinned to an alkali fluidity of 20 to 90 cc., then cooling the heated composition to a forming temperature of 120 to 220° F. and subsequently forming the composition into a desired shape, the water-to-starch ratio being at least 1.9.

9. The method of claim 8 in which the composition has a starch content in the range of 4 to 8% and the ratio of water to starch is in the range of 2.4 to 7.1 at the time the composition is heated and when it is formed.

10. The method of claim 9 in which the sweetener is more than 85% of the composition and comprises at least 55% of a normally liquid syrup selected from the group consisting of invert syrup and starch syrup.

11. The method of claim 10 in which the syrup is starch syrup.

12. The method of claim 11 in which the composition is cooled and formed under conditions that do not permit substantial crystallization of the sugar present.

References Cited
UNITED STATES PATENTS

| | | | |
|---|---|---|---|
| 3,218,177 | 11/1965 | Robinson et al. | 99—134 |
| 3,446,628 | 5/1969 | Schoch et al. | 99—134 |
| 3,084,050 | 4/1963 | Holland et al. | 99—148 UX |
| 2,726,960 | 12/1955 | Bolanowski | 99—134 |

RAYMOND N. JONES, Primary Examiner

J. M. HUNTER, Assistant Examiner

UNITED STATES PATENT OFFICE
CERTIFICATE OF CORRECTION

Patent No. 3,687,690  Dated August 29, 1972

Inventor(s) Carl O. Moore

It is certified that error appears in the above-identified patent and that said Letters Patent are hereby corrected as shown below:

Column 2, line 17, for "point and" read ---point) and---.
Column 3, line 34, for "evamples" read ---examples---.
Column 7, line 74, for "srufaces" read ---surfaces---.
Column 9, line 15, for "but is can" read ---but it can---.
Column 10, line 37, for "into" read ---onto---.
Column 10, line 47, for "to do more" read ---to no more---.
Column 11, line 24, for "alkali" read --alkaline--.

This certificate supersedes Certificated of Correction issued December 17, 1974.

Signed and Sealed this

Twenty-second Day of May 1979

[SEAL]

Attest:

RUTH C. MASON
Attesting Officer

DONALD W. BANNER
Commissioner of Patents and Trademarks